US 6,975,879 B1

(12) United States Patent
Aalto et al.

(10) Patent No.: US 6,975,879 B1
(45) Date of Patent: Dec. 13, 2005

(54) METHOD AND A SYSTEM FOR CONTROLLING A MACRODIVERSITY CONNECTION THROUGH AT LEAST TWO RADIO NETWORK CONTROLLERS

(75) Inventors: Risto Aalto, Riihimäki (FI); Pekka Kohonen, Espoo (FI); Fabio Longoni, Milan (IT); Pekka Marjelund, Espoo (FI); Oscar Salonaho, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/622,240

(22) PCT Filed: Feb. 12, 1999

(86) PCT No.: PCT/FI99/00110

§ 371 (c)(1),
(2), (4) Date: Nov. 13, 2000

(87) PCT Pub. No.: WO99/41850

PCT Pub. Date: Aug. 19, 1999

(30) Foreign Application Priority Data

Feb. 16, 1998 (FI) ...................................... 980348
Aug. 24, 1998 (FI) ...................................... 981811

(51) Int. Cl.[7] ........................... H04Q 7/20; H04Q 0/00; H04B 7/00
(52) U.S. Cl. ...................... 455/522; 455/522; 455/453; 455/442; 455/426.1; 370/328; 370/331; 370/332
(58) Field of Search ......................... 455/522, 69, 442, 455/426.1, 453; 370/328, 331, 332, 338

(56) References Cited

U.S. PATENT DOCUMENTS

| 5,533,014 A | | 7/1996 | Willars et al. ................. 370/18 |
| 5,649,000 A | * | 7/1997 | Lee et al. .................... 455/436 |
| 5,828,659 A | | 10/1998 | Teder et al. ................. 370/328 |
| 5,878,350 A | * | 3/1999 | Nakamura et al. .......... 455/442 |
| 5,956,641 A | * | 9/1999 | Bruckert et al. ............ 455/442 |
| 6,078,817 A | * | 6/2000 | Rahman ................... 455/452.1 |
| 6,230,013 B1 | * | 5/2001 | Wallentin et al. ........... 455/436 |

FOREIGN PATENT DOCUMENTS

| EP | 0 680 160 | 11/1995 | .......... H04B 7/005 |
| EP | 0 740 486 | 10/1996 | ............ H04Q 7/38 |

(Continued)

OTHER PUBLICATIONS

European Search Report dated Oct. 8, 1999, Swedish Patent Office.

*Primary Examiner*—Nick Corsaro
*Assistant Examiner*—Yuwen Pan
(74) *Attorney, Agent, or Firm*—Harrington & Smith, LLP

(57) ABSTRACT

A method of changing connection parameters in a cellular radio system comprising terminals, base stations, and radio network controllers, and where at least one terminal is in a macrodiversity connection wherein at least one diversity branch goes between the serving radio network controller and the terminal through the drift radio network controller and the drift base station, and which further comprises a load control wherein the radio network controller monitors and balances the use of radio resources in the base stations that operate under it, and a call control wherein the serving radio network controller sets and changes the connection parameters of its connections, and being characterized in that it comprises observing that the load control of the drift radio network controller demands a change in the connection parameters of the terminal communicating through the base station that operates under it, and controlling the serving radio network controller to change the connection parameters of said terminal.

8 Claims, 6 Drawing Sheets

FOREIGN PATENT DOCUMENTS

| | | | | | | | |
|---|---|---|---|---|---|---|---|
| EP | 0 809 365 | 11/1997 | .......... H04B 7/005 | WO | WO 95/08897 | 3/1995 |
| WO | WO 94/30024 | 12/1994 | | WO | WO 96/26620 | 8/1996 |

* cited by examiner

METHOD AND A SYSTEM FOR CONTROLLING A MACRODIVERSITY CONNECTION THROUGH AT LEAST TWO RADIO NETWORK CONTROLLERS

CROSS REFERENCE TO RELATED APPLICATIONS

This application claims priority from International Application No. PCT/FI99/001100, filed on Feb. 12, 1999, which itself claims priority to Finland Patent Application Nos. 980348 and 981811, filed on Feb. 16, 1998 and Aug. 24, 1998, respectively.

BACKGROUND OF THE INVENTION

The present invention relates in general to control activities in a situation where a cellular radio system terminal is simultaneously in radio connection with at least two base stations. In particular, the invention relates to the transmission of parameters related to call control between the cellular radio system parts which data transmission in such a situation relates to.

A macrodiversity connection means a situation where a cellular radio system terminal is simultaneously in radio connection with at least two base stations, whereupon the same information can be routed from the terminal to the network or from the network to the terminal through at least two different routes. In particular, a macrodiversity connection can be utilised in systems based on spread spectrum technique when the terminal is close to the boundary between cells or in an area where several cells are located entirely or partly on top of one another. A procedure, where a terminal drawing away from a given first base station first establishes a macrodiversity connection wherein it is simultaneously in communication with the first and a second base station, is called a soft handover. The terminal will transfer completely under the second base station only after the connection through the second base station becomes preferable to the macrodiversity connection. Drawing away should be understood in a broad sense, i.e. so that the connection to the first base station becomes poor in relation to the quality target set on the connection either as the physical distance grows, interference impeding the connection increases or the connection quality target changes.

In a cellular radio system based on spread spectrum technique, it is preferable for the performance of the system to keep the transmission powers as low as possible in both terminals and base stations. In a macrodiversity connection, it is possible to use a lower transmission power than if the connection between the terminal and the network went through only one base station while the other factors remain unchanged. On the other hand, spread spectrum technique provides naturally good opportunities for connecting such signal components, which arrive at a combining point at different power levels and delays either because of different types of propagation paths on the radio path or due to macrodiversity. Because of these factors, more and more macrodiversity connections will probably be used in the future. The commonest application of spread spectrum technique is the CDMA (Code Division Multiple Access) cellular radio system.

FIG. 1 shows a well-known situation where a terminal (MS, Mobile Station) 100 is simultaneously in radio connection with base stations (BS) 101 and 102. What is particular in the case shown in FIG. 1 is that the BS 101 operates under a first radio network controller (RNC) 103 and the BS 102 operates under a second radio network controller 104. An interface 105 between a RNC and a base station is called an Iubis interface and an interface 107 between a RNC and a core network 106 (CN) is called an Iu interface. The abbreviation or the part Iu of the abbreviation comes from the words Interface UMTS where UMTS means a proposal for a third generation digital cellular radio system (Universal System for Mobile Communications). An interface 108 between two RNCs is called an Iur interface. It has been assumed in FIG. 1 that the RNC 103 is a so-called serving RNC of the macrodiversity connection shown in the figure, and the RNC 104 is a so-called drift RNC subordinated thereto. The combining of signal components essential for the macrodiversity connection takes place in the serving radio RNC 103 according to the definition. A part 109 of the RNC wherein the combining takes place is called a MDC (MacroDiversity Combiner).

In a macrodiversity connection, a signal's paths between the terminal 100 and the combiner 109 are called branches. Due to macrodiversity, it is possible to use in each branch lower transmission power than if the corresponding branch established a single connection between the terminal and the network. Also the combined power of the branches remains lower than in a conventional single connection. In FIG. 1, the macrodiversity connection consists of three branches two of which go between the serving RNC and the terminal directly through the serving BS and one branch goes through the drift RNC and the drift BS.

Each RNC is responsible for the so-called network balancing in the area of its own base stations. In practice, this means that the RNC sets upper and lower limits on the number of simultaneous connections, the amount of radio resources available for each connection and the transmission powers of the base stations and the terminals that are in radio connection with them so that the transmission powers are optimal as for the overall performance of the system. Network balancing is also called load control.

Each serving RNC is responsible for the call control of its own calls. Call control includes, e.g. combining new macrodiversity branches, removing existing macrodiversity branches or changing the connection parameters (e.g. data rate, transmission power or the spreading code to be used) of existing macrodiversity branches. Normally, so-called fast closed-loop power control where transmission power control is based on measuring the ratio between the signal power received at the base station and the interference power and comparing the measurement result to the set target value, is applied in each radio connection. The information describing the comparison result is transmitted as response to the transmitting device. Another part of the power control is the outer power control loop which, at regular intervals, computes a new target value for the closed-loop power control on the basis of the quality of the connection (e.g. bit error ratio) at the time in question. Because the serving RNC's MDC is the only place where the combined quality of the signal components, arriving along different paths, of a terminal in a macrodiversity connection can be measured, the serving RNC's call control computes the closed-loop power control target values.

In a situation shown in FIG. 1, the problem is that the connection-parameters controlled by the call control contained in the serving RNC can be contradictory to the limitations set by the drift RNC's load control either because the connection parameters change during the connection or because the limitations change during the connection.

SUMMARY OF THE INVENTION

The objective of the present invention is to present a method and a system where call control during a macrodiversity connection can be implemented by demanding only little data transmission capacity between the different parts of the system.

The objectives of the present invention are reached so that the drift RNC transmits to the serving RNC the required information relating to load control and the serving RNC transmits, in the opposite direction, the connection parameters during the macrodiversity connection, which the drift RNC converts into a format according to its own Iubis interface, if necessary, before transmitting the information to a base station.

A cellular radio system according to the invention comprises terminals, base stations, radio network controllers and, in at least two radio network controllers, means for establishing connection parameters and for transmitting them to a base station, and means for controlling load by monitoring and balancing the use of radio resources in the base stations that operate under it.

It is characteristic of the system that in order to change the connection parameters in a macrodiversity connection a given branch of which goes between a first RNC and a terminal through a second RNC and a base station, it comprises in the second RNC, means for establishing information resulting from load control and limiting the connection parameters, and transmitting it to the first RNC.

The invention also relates to a method which is characterised in that in a macrodiversity connection where a given branch goes between a serving RNC and a terminal through a drift RNC and a drift BS, it comprises the steps of:
  observing, in the drift RNC, the need to change the connection parameters due to load control in said macrodiversity connection branch, and
  transmitting the information limiting the connection parameters in said macrodiversity connection branch from the drift RNC to the serving RNC.

Furthermore, the invention relates to a RNC, which is characterised in that it comprises means for establishing information resulting from load control and limiting the connection parameters in a branch of a macrodiversity connection and for transmitting it from a drift RNC to a serving RNC,
  means for establishing information controlling the transmission power of said branch of the macrodiversity connection and for transmitting it from the serving RNC to the drift RNC, and
  means for establishing information controlling the transmission power of a drift base station on the basis of controlling information received from the serving RNC and for transmitting it to the drift base station.

According to the invention, each RNC is further responsible for load control in the area of its own base stations. In addition to this, the drift RNC informs the serving RNC of the limitations caused by load control to the macrodiversity connection branch which goes through the drift RNC. The serving RNC establishes the information controlling the connection parameters, e.g. transmission power, in this branch so that it does not violate the limitations indicated by the drift RNC and sends it to the drift RNC. If the Iubis interface between the RNCs and the base stations operating under them is different, the drift RNC reformats the information controlling transmission power it has received so that it can be sent through the Iubis interface to the base station. If again the Iubis interfaces are similar, the information sent by the serving RNC can be further transmitted directly from the drift RNC to the base station without being reformatted.

Due to the invention, load control and call control are independent of one another in each RNC and, therefore, it is possible to develop an optimised algorithm for each. Manufacturers are not presumed to standardise the Iubis interface, and the requirements set on the Iur interface between RNCs are only limited to a few messages to be exchanged. On the other hand, control between the different branches of each macrodiversity connection, such as power control, can be concentrated in one place, which guarantees the functioning of the macrodiversity connection and the optimization of the use of radio resources in the best possible way.

BRIEF DESCRIPTION OF THE SEVERAL VIEWS OF THE DRAWINGS

In the following, the invention will be described in more detail by referring to a preferred embodiment as an example and the enclosed figures, in which.

DETAILED DESCRIPTION OF THE INVENTION

Figure 1:
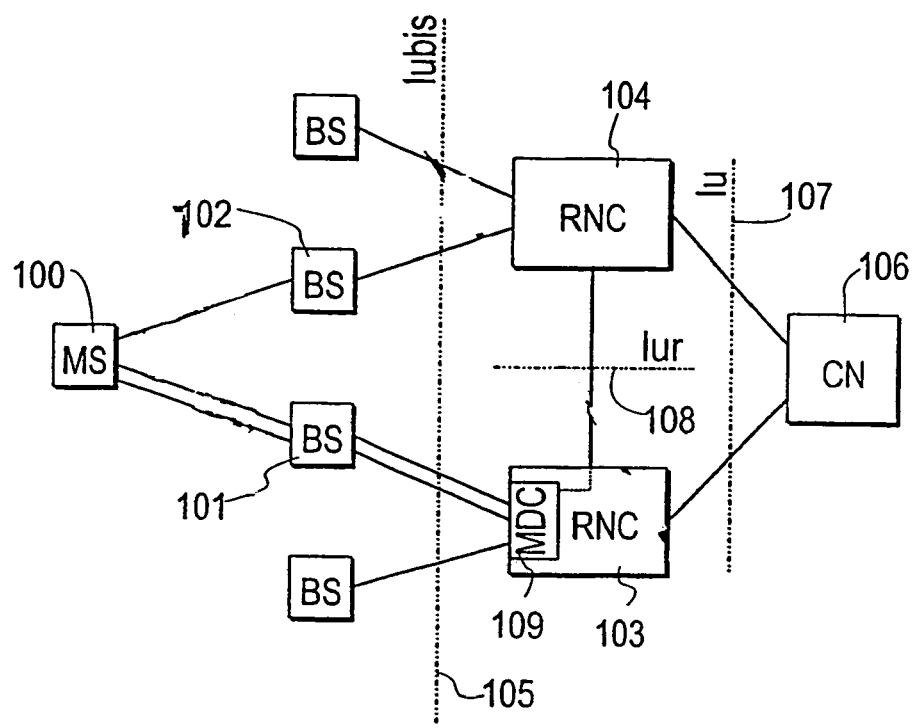
FIG. 1 shows a well-known macrodiversity connection concept.

Above, in connection with the presentation of prior art, a reference was made to FIG. 1 and, therefore, in the following presentation of the invention and its preferred embodiments, a reference will mainly be made to FIGS. 2–7. In the figures, same reference numbers will be used for corresponding parts.

Figure 2:
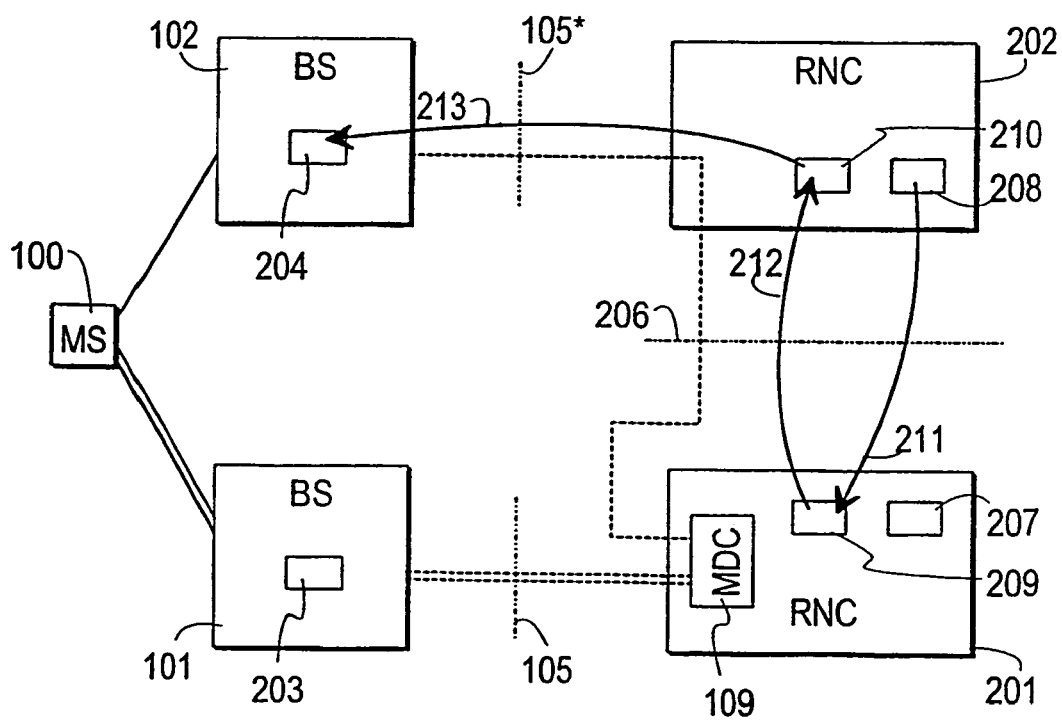
FIG. 2 shows the flow of information in a macrodiversity connection according to the invention.
Figure 3:
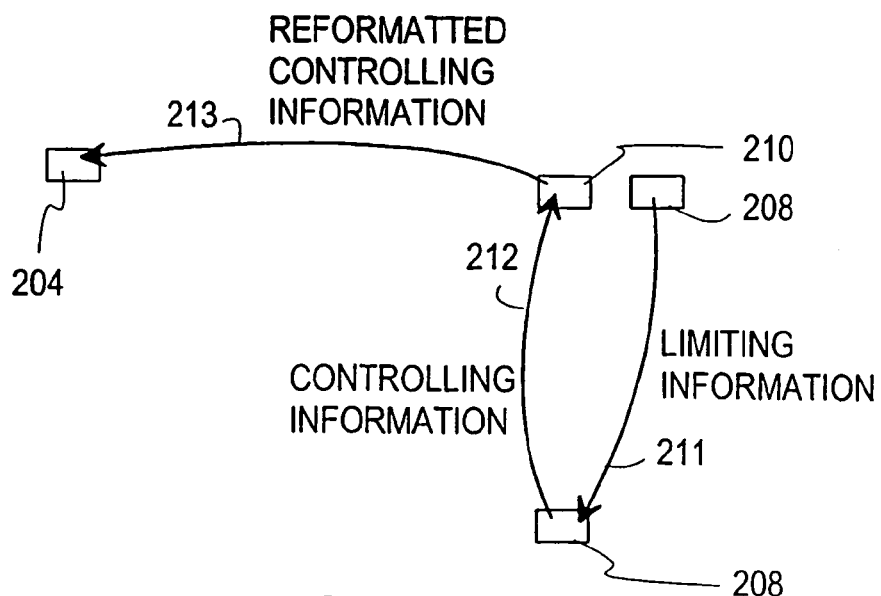
FIG. 3 shows a detail of FIG. 2.

FIG. 2 shows a part of a cellular radio system, which includes the terminal 100, the base stations 101 and 102, as well as the two RNCs 201 and 202. Connections to elsewhere in the cellular radio system are not shown in the figure for reasons of clarity. Between the terminal 100 and the MDC 109, located in the RNC 201, there is a macrodiversity connection wherein the RNC 201 is a serving RNC and the RNC 202 is a drift RNC. Correspondingly, the BS 101 can be called a serving base station and the BS 102 can be called a drift base station. Between the serving RNC 201 and the terminal 100, there are two branches, which go through the serving BS 101. The terminal 100 and the BSs 101 and 102 can be in accordance with prior art as such. The serving BS 101 has a part 203 responsible for fast closed-loop power control, known as such, which controls the transmission power of the serving BS and the terminal according to the closed-loop principle taking into consideration the target value set by the outer loop, which the serving BS 101 has received from the serving RNC 201. In the drift BS 102, the corresponding closed-loop power control part, known as such, is marked with a reference number 204. The Iubis interface 105 between the serving BS 101 and the serving RNC 201 can be similar to or different from the Iubis interface 105* between the drift base station 102 and the drift RNC 202.

The serving RNC 201 contains a load control part or a load control 207, which is responsible for the limitations to be set on the numbers of simultaneous connections, the amount of radio resources available to each connection, and the transmission powers of base stations and the terminals which are in radio connection with them, which are based on the optimization of the overall capacity of the cellular radio system. In the drift RNC 202, the corresponding load control part is marked with a reference number 208. The serving RNC 201 also contains a call control 209, which sets for each connection the connection parameters at which the connection between a base station and a terminal can operate. In the drift RNC 202, the corresponding call control is marked with a reference number 210.

Because the RNC 201 is the serving RNC of the macrodiversity connection shown in FIG. 2, its call control part 209 is responsible for setting and changing the connection parameters in both the branch that goes through the serving BS 101 and the branch that goes through the drift BS 102. According to the invention, the information on what limitations load control under the drift RNC 202 sets on the connection parameters is transmitted from the load control part 208 of the drift RNC 202 to the call control part or call control 209 of the serving RNC. In FIG. 2, the transmission of this information is marked with an arrow 211. When establishing connection parameters for the branch that goes through the drift BS 102, the call control 209 of the serving RNC 201 takes this information into consideration so that the connection parameters relating to the branch that goes through the drift BS 102 so not violate the load control activities carried out by the drift RNC 202. The details of information establishment will be discussed later. The established connection parameters relating to the branch that goes through the drift BS 102 are transmitted back to the drift RNC 202, which is illustrated by an arrow 212. The information is directed to the call control 210 of the drift RNC 202.

Because the Iubis interfaces 105 and 105* can differ from one another, the connection parameters transmitted as illustrated by the arrow 212 are not necessarily in the format where they could directly be transmitted to the drift BS 102. The call control 210 of the drift RNC 202 or a given reformatting part (not shown in the figure) located in the drift RNC reformats the information if necessary according to the requirements of the Iubis interface 105* before it is sent to the drift BS 102. The transmission of the connection parameters to the drift BS 102 in a format conforming to the requirements of the Iubis interface 105* is marked with an arrow 213.

The invention does not set restrictions on what information and in which format it is used in the data transmission illustrated by the arrows 211, 212, and 213 as long as the data transmission has the effect described above. In the following, we will describe an exemplary embodiment by referring to FIG. 3.

The information illustrated by the arrow 211 is called limiting information. The load control part 208 of the drift RNC can give the outer loop control part 209 of the drift RNC as limiting information, e.g. the downlink transmission power absolute maximum and minimum values which, in this patent application, are referred to as DL_Pmax and DL_Pmin, as well as the maximum and minimum values of the target level of an uplink Eb/N0 value referred to as Eb/N0_setpoint_max and Eb/N0_setpoint_min. The information illustrated by the arrow 212 is called controlling information. The outer loop control part 209 of the serving RNC can give the outer loop control part 210 of the drift RNC as controlling information, e.g. the downlink transmission power maximum and minimum values referred to as DL_Pmax' and DL_Pmin', as well as the uplink Eb/N0 value target level referred to as Eb/N0_setpoint. The difference between the values DL_Pmax and DL_Pmin and DL_Pmax' and DL_Pmin' is that the former are defined on the basis of load control, whereas the latter are defined on the basis of the operation of the outer loop power control algorithm of the macrodiversity connection.

So that the above-mentioned prerequisite of non-conflicting data transmission illustrated by the arrow 211 and 212 would be valid, the above-mentioned exemplary values should comply with the following inequalities:

$$PL\_Pmin' \geq DL\_Pmin \quad (1)$$

$$DL\_Pmax' \leq DL\_Pmax \quad (2)$$

$$Eb/N0\_setpoint\_min \leq Eb/N0\_setpoint \leq Eb/N0\_setpoint\_max \quad (3)$$

For reasons of clarity, the information illustrated by the arrow 213 is called reformatted controlling information irrespective of whether the drift RNC has reformatted it or not. For the operation of the system, its content is substantially the same as the content of the controlling information illustrated by the arrow 212.

The above-mentioned downlink transmission power limit values DL_Pmax, DL_Pmin, DL_Pmax' and DL_Pmin' can directly be transmission powers as dBm values or they can be code values which, in radio network controllers and base stations, map as power values according to pre-determined correlations. The Eb/N0 value means the energy of a received signal per bit (Eb) divided by general noise power density (N0), and it is a commonly used parameter in spread spectrum systems. The Eb/N0 value target level in uplink data transmission describes the ratio between a signal, received by a base station in a given uplink connection, and noise which, in a CDMA cellular radio system, is mainly produced by other simultaneously transmitted signals in the same cell. When a base station and/or a terminal knows the Eb/N0 value target level, the transmission power of the terminal can be adjusted by closed-loop control towards a value at which the required target level in the base station can be achieved.

Other information which can be included in data transmission according to the arrows 211, 212, and 213 are, e.g. modulation methods of different level and spreading codes, the distribution of radio resources reserved by other simultaneous connections in the transmission frames of different base stations, the initial power of different logical channels belonging to the same connection with which data transmission is initiated before closed-loop control has been implemented at all, as well as the information on possible different bearers multiplexed in the same connection, which belong within the range of common power control.

Above, we have only discussed macrodiversity connections having three branches. The invention does not restrict the number of branches included in a macrodiversity connection. In a macrodiversity connection having more branches, the invention can be applied so that the exchange of information between a drift RNC and a serving RNC functions as such in each branch independent of the other branches. The only factor that unites the branches is an algorithm operating in the serving RNC, which computes transmission power limit values, Eb/N0 value target levels and/or other corresponding information. Naturally, it is taken into consideration in the computation that the question is of a macrodiversity connection whereupon, generally, the transmission powers, Eb/N0 value target levels and other corresponding factors in each branch are the lower the more branches are included in the macrodiversity connection. The invention is also applicable for use in a macrodiversity connection where not a single branch goes through serving base stations but, instead, all the branches go through one or more drift RNCs and drift base stations.

As for the standardisation of interfaces in a network, the invention only presupposes that there is some common procedure which is used in the Iur interfaces between RNCs for transmitting the messages that contain information relating to load control and/or to the outer loop control instructions to be sent to base stations. Each manufacturer can define the Iubis interfaces as one prefers to. The invention does not restrict how often the information illustrated by the arrows 211, 212, and 213 is transmitted between different devices. The data-updating rate can be constant or it can be proportioned to the free data transmission capacity between the RNCs and/or to the network load situation and its changes, observed by measuring.

If a terminal performs a soft handover, a given RNC, which was previously a drift RNC, and the drift base stations operating under it become serving, and the base station and RNC, which were previously serving, become drift. After changing their roles, the controlling of the macrodiversity connection continues as presented above taking into consideration that the serving RNC is now a different RNC from the previous one.

Figure 4:
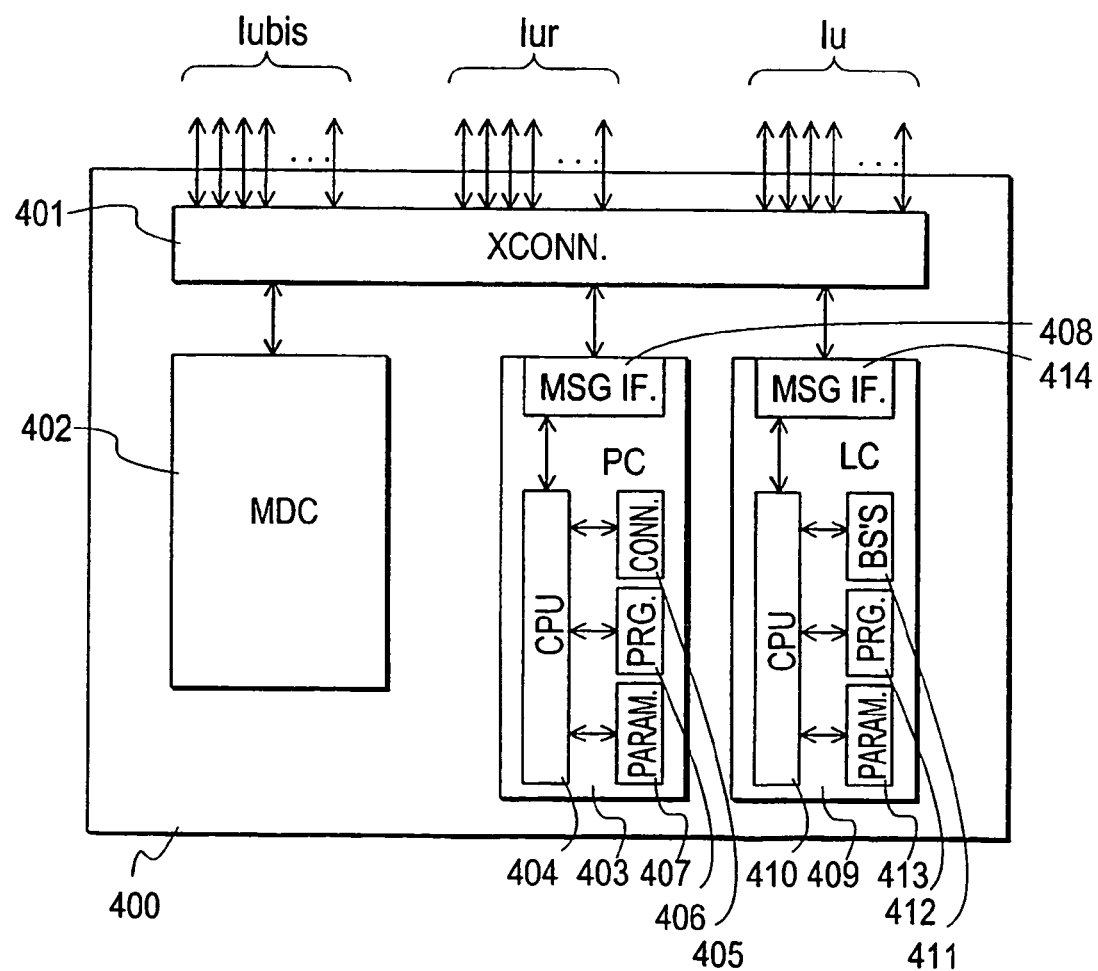
FIG. 4 shows schematically a radio network controller according to the invention.

FIG. 4 shows schematically the parts of a RNC 400, according to the invention, which are of importance to the invention. For directing transferable information between different interfaces and the internal functional blocks of the RNC 400, the RNC has a cross-connection block 401 from which there are connections according to the Iubis interface to base stations operating under the RNC 400, connections according to the Iur interface to other RNCs and at least one connection according to the Iu interface to the core network. A macrodiversity connection block 402 is responsible, in a manner known as such, for connecting uplink signal components and copying downlink signal components that belong to those macrodiversity connections wherein the RNC 400 operates as a serving RNC.

A power control block 403 is responsible for outer loop power control in all those branches where the RNC 400 operates as a serving RNC. Its operation is concentrated on a microprocessor 404, which can use a connection memory 405, a program memory 406, and a parameter memory 407. The connection memory 405 contains the valid power control information relating to each active radio connection that goes through the RNC 400, i.e. the power control limit values produced by outer loop control, in particular. The program memory 406 contains a program, which the microprocessor 404 performs in order to carry out its activities. The parameter memory 407 contains general operation controlling parameters, which the RNC 400 has typically received from the operator controlling the operation of the network. A message interface 408 formats and interprets the messages arriving at and leaving the power control block 403 so that, e.g. a message coming from a drift RNC is correctly interpreted, whereupon the power control limit values resulting from load control, contained in it, end up to the right radio connection in the connection memory 405.

A load control block 409 is responsible for load control, i.e. for balancing the network concerning radio traffic produced by all those base stations that operate under the RNC 400. Its operation is concentrated on a microprocessor 410, which can use a base station memory 411, a program memory 412, and a parameter memory 413. The base station memory 411 contains the information, relating to each base station that operate under the RNC 400, about the radio resources reservation situation in the base station in question. The program memory 412 contains a program, which the microprocessor 410 performs in order to carry out its activities. The parameter memory 413 contains general operation controlling parameters, which the RNC 400 has typically received from the operator controlling the operation of the network. A message interface 414 formats and interprets the messages arriving at and leaving the load control block 409.

Figure 5:
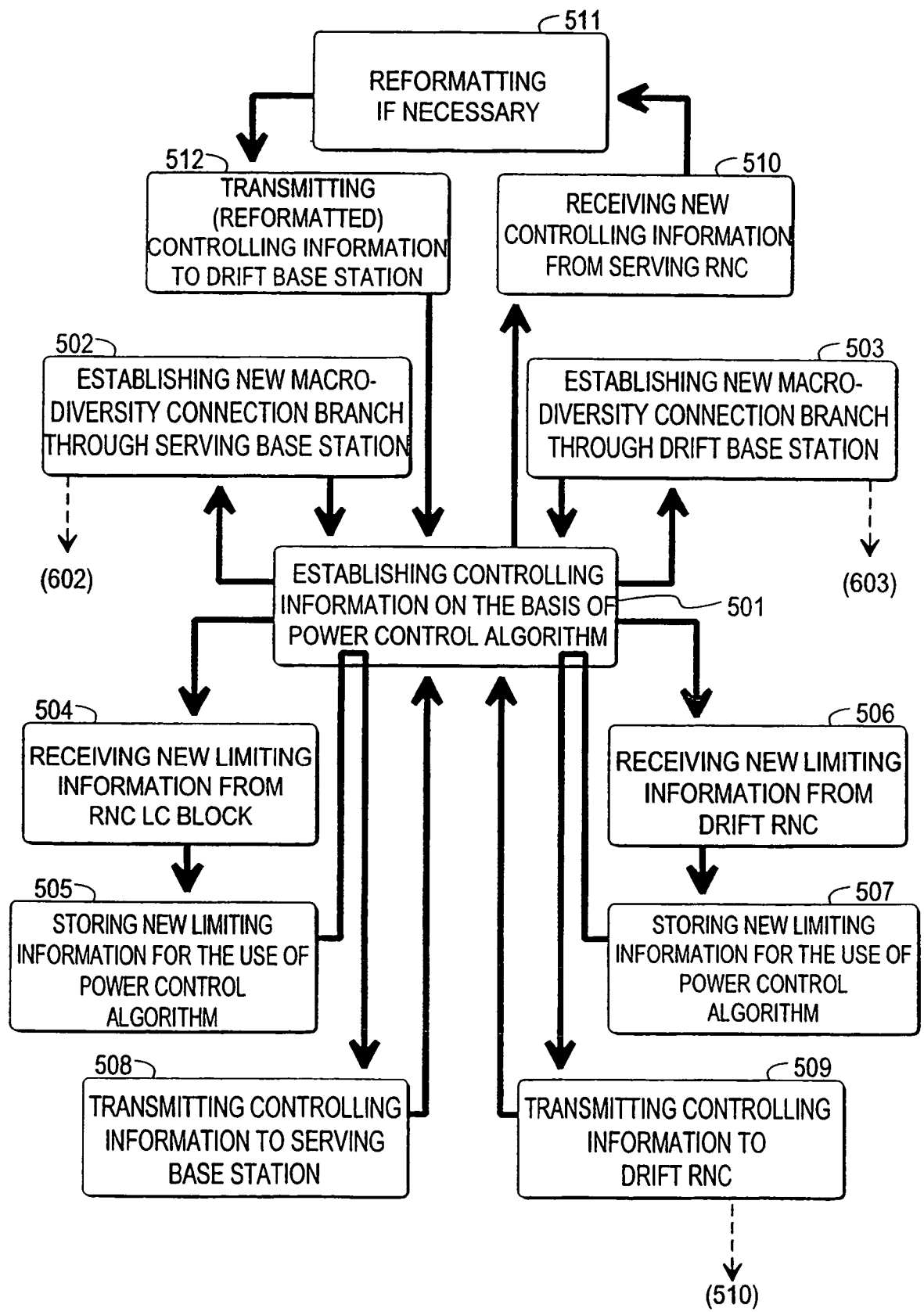
FIG. 5 shows one part of the invention as a state transition diagram.
Figure 6:
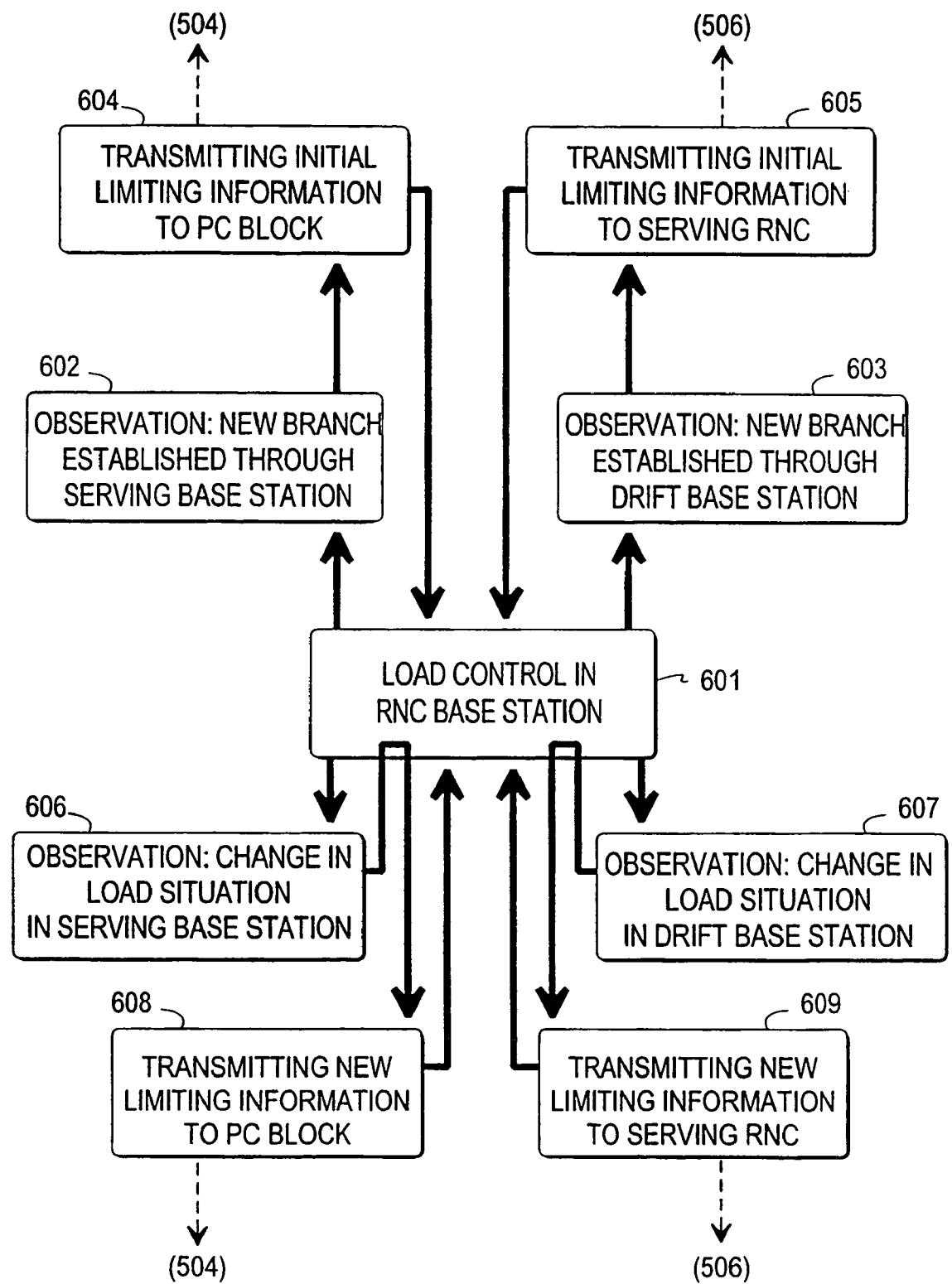
FIG. 6 shows another part of the invention as a state transition diagram.

The state transition diagram in FIGS. 5 and 6 show operation in a power control block (FIG. 5) and in a load control block (FIG. 6) of a RNC, according to one embodiment of the invention. In the figures, it is assumed that outer loop power control and load control take place in RNCs independent of one another, except that the controlling information produced by outer loop power control should not violate the values gained from load control. It is also possible to present an embodiment of the invention where a serving RNC receives from drift RNCs limiting information describing load control as response to an inquiry sent to them or an alternative embodiment that requires a little less signalling between RNCs where drift RNCs send-limiting information according to a given schedule without a separate inquiry.

A status 501 is the basic status of a power control block wherein it computes, on the basis of the available information, such controlling information on the basis of which optimal transmission powers can be selected in each connection within the range of power control. Statuses 502 and 503 correspond to the establishment of a new macrodiversity branch either through a serving (status 502) or drift (status 503) base station. In connection with the establishment of a new branch, given default values can be used as controlling information.

The power control block can receive limiting information either from the load control block of the same RNC (concerning connections through serving base stations) or from drift RNCs (concerning connections through drift base stations). A status 504 corresponds to the reception of limiting information from the same RNC, whereupon the information is stored according to a status 505 in a memory for the use of a power control algorithm. When limiting information is received from a drift RNC, the corresponding statuses are 506 and 507. In both cases, the power control block uses the stored limiting information to check that the established controlling information does not violate the limiting information. The controlling information that has passed the inspection (and was corrected if necessary) is sent to serving base stations according to a status 508 and to drift RNCs according to a status 509.

When the power control block operates in a drift RNC and receives, according to a status 510, controlling information from a serving RNC in a format according to the Iur interface, it reformats the information if necessary in a status 511 and sends it, in a status 512, to drift base stations in a manner required by the Iubis interface between the drift RNC and its base stations. The excitations produced by given statuses are marked in the figure with dashed line arrows and reference numbers in brackets. For example, the status 509 in the power control block of a given first RNC causes a transfer to a status 510 in the power control block of a given second RNC. The processing phase established by the status 511 is not necessarily required if the drift RNC always first writes the controlling information it has received through the Iur interface in a memory and then forwards it according to its own Iubis interface. In this case, reformatting always takes place naturally when it is needed.

In FIG. 6, a status 601 is the basic status of the load control block wherein it carries out the activity according to the load control algorithm. The observation according to which a new macrodiversity connection branch is being established through a base station that operates under a RNC causes a transfer to a status 602 or 603 depending on whether the RNC in the new branch in question is serving or drift. According to a status 604 or 605, given default limiting information can be given as initial limiting information.

Always when the load control block observes a change in the load in a base station operating under it, it aims at computing the limiting information according to the new load situation. Observing the changing of the load is described by two separate statuses 606 and 607 depending on whether the base station in question is serving or drift from the viewpoint of the dynamic radio connection; it could also be described by a single status. When the limiting information according to the new load situation has been established, it is sent either to the power control block of the same RNC according to a status 608 or to a serving RNC according to a status 609.

Figure 7:
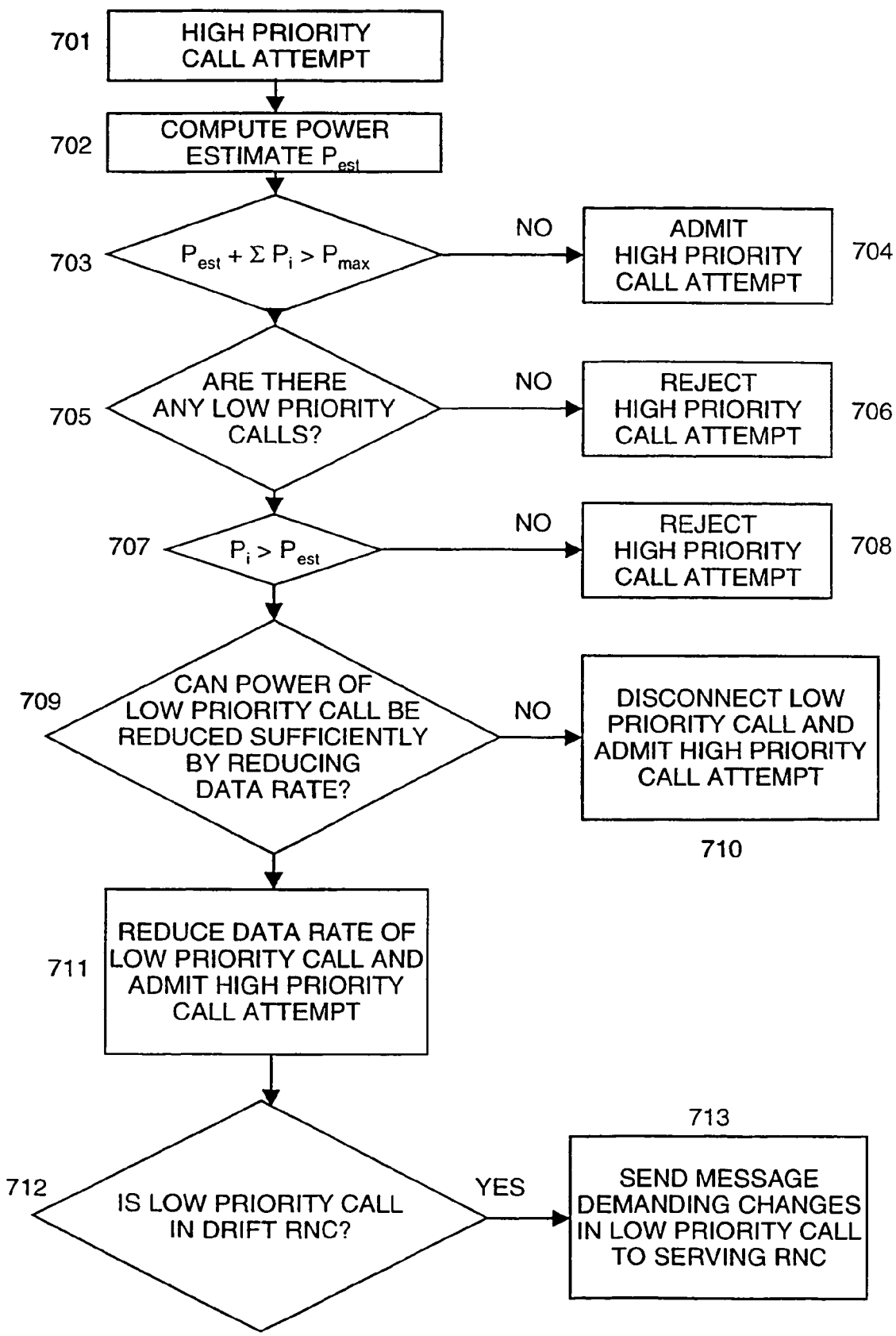
FIG. 7 shows a second detail of FIG. 2.

The block diagram in FIG. 7 shows a second embodiment of the invention where the load control of a drift RNC and, particularly, the call admission control (CAC) included therein demands changes in the connection parameters (data rate, power, etc.) of a terminal in a macrodiversity connection.

In an initial situation 701, the load control of a RNC observes a high priority call attempt, e.g. by receiving a message, indicating the call attempt, from a subscriber terminal through its base station. Immediately after this, in a block 702, the load control computes an estimated power Pest for the call attempt using the parameters provided by the message indicating the call attempt (e.g. required data rate, subscriber's speed of mobility, and the required Quality of Service, QoS).

When the estimated power $P_{est}$ is known, the load control moves to a block 703 wherein it compares the value $\Sigma P_i + P_{est}$, combined from the current powers $P_i$ of the calls in progress in the area of the cell that received the high priority call attempt and the estimated power $P_{est}$ of the high priority call attempt, to the upper limit $P_{max}$ set by the network operator. Although, in this example, the powers are directly combined by summing up for reasons of simplicity, other ways of combining are also possible, e.g. a logarithmic sum. If the combined value $\Sigma P_i + P_{est}$ is lower than the upper limit $P_{max}$, set by the network operator, the load control moves to a block 704 wherein it admits the high priority call attempt without special procedures. As a result of the admission of the call attempt, the RNC reserves for the call appropriate resources controlled by it, e.g. from the radio interface, base station, Iubis interface and RNC, and informs the core network of the admission of the call attempt (not shown in the figure).

If the combined value $\Sigma P_i + P_{est}$ in turn is higher than the upper limit $P_{max}$, set by the network operator, the load control moves to a block 705 wherein it checks whether there are any lower priority calls in progress in the area of the cell that received the high priority call attempt. If there are no lower priority calls in progress, the load control moves to a block 706 wherein it rejects the high priority call attempt. The RNC informs the terminal of the rejection by sending a message, which gives the reason for the rejection (not shown in the diagram).

If there are lower priority calls in progress, the load control moves to a block 707 wherein it checks whether the power $P_i$, at the time in question, of any of the lower priority calls in progress is higher than the computed estimated power $P_{est}$ of the high priority call attempt. If, at the time in question, the power of none of the lower priority calls exceeds the estimated power of the high priority call attempt, the load control moves to a block 708 wherein it rejects the high priority call attempt. As presented above, the RNC informs the terminal of the rejection by sending a message, which gives the reason for the rejection (not shown in the diagram).

If, at the time in question, the power of some of the low priority calls is higher than the estimated power of the high priority call attempt, the load control moves to a block 709 to examine whether the power of the lower priority call could be reduced, e.g. by reducing the data rate so that the combined value of the powers of the calls in progress and the power of the high priority call is lower than the limit value set by the network operator. If the power of the lower priority call cannot sufficiently be reduced, the load control moves to a block 710 wherein it decides on the disconnection of the lower priority call and the admission of the high priority call attempt after which it moves to a block 712.

If the power of the lower priority call can sufficiently be reduced, the load control process moves to a block 711 wherein it decides to reduce the power of the lower priority call and to admit the high priority call attempt after which it moves to a block 712.

In the block 712, the load control examines whether the RNC for the changed lower priority call is a drift RNC. If the RNC, containing the load control, is not a drift RNC for the lower priority call, the load control demands the call control of its own RNC to disconnect the lower priority call or to reduce its data rate, and informs of the admission of the high priority call attempt (not shown in the diagram).

If the changed lower priority call is in a drift RNC, the load control moves to a block 713 wherein it demands the call control part of the serving RNC, by sending a message over the Iur interface, to disconnect the lower priority call or to reduce its data rate, and informs the call control part of its own RNC of the admission of the high priority call attempt (not shown in the diagram). In both cases, the RNC carries out the activities relating to the admission of the high priority call attempt as described in connection with the block 704 (not shown in the diagram).

It should be noted that, although, the drift RNC informs about the need to reduce the data rate of the lower priority call, the serving RNC is not obliged to do this but, instead, it may also maintain the original data rate and release the diversity branch that goes through the drift RNC as unnecessary.

Figure 8:
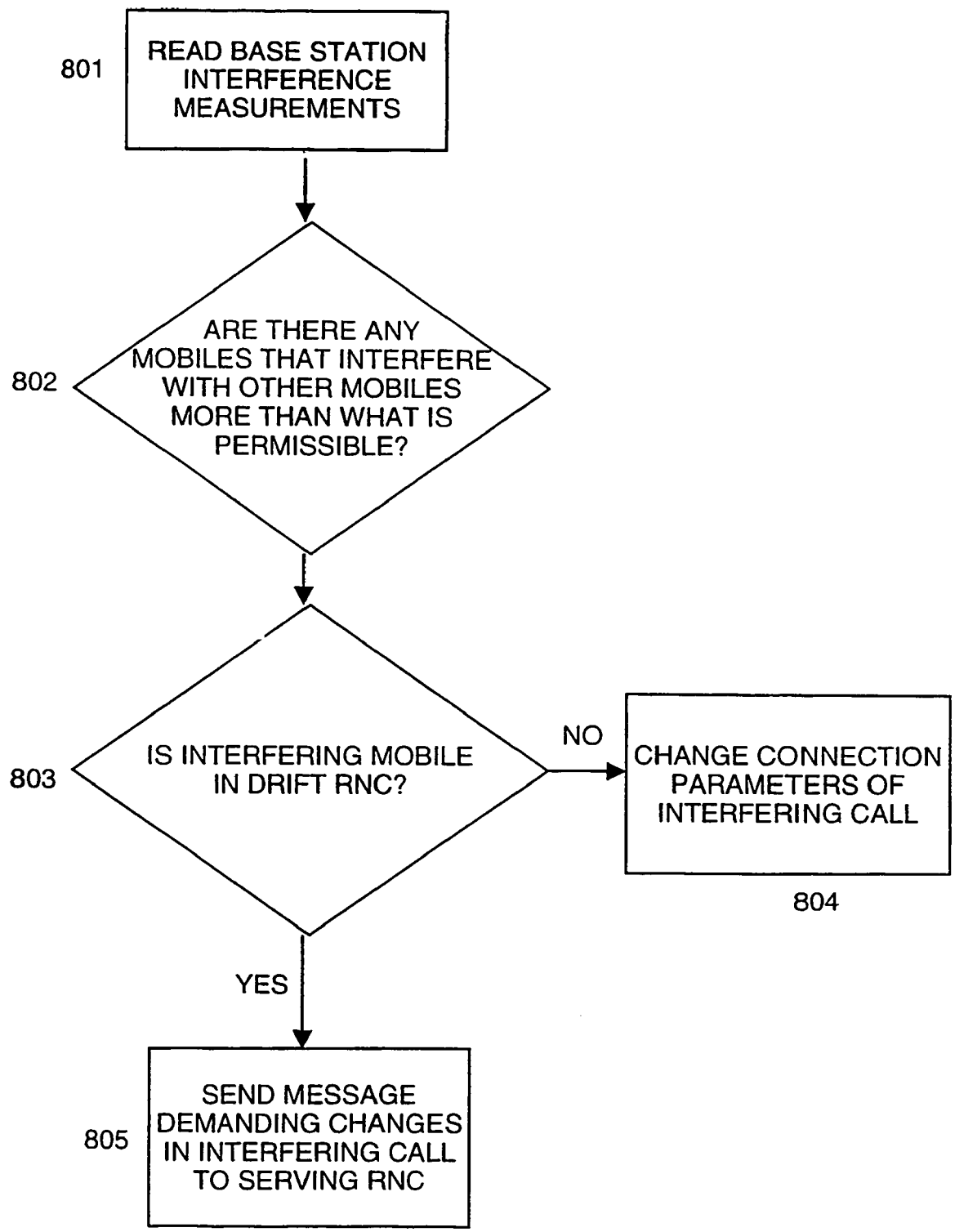
FIG. 8 shows a third detail of FIG. 2.

The block diagram in FIG. 8 shows a third embodiment of the invention where the load control of a drift RNC demands changes in the connection parameters (data rate, power, etc) of a terminal in a macrodiversity connection.

In an initial situation 801, the load control of the RNC reads the interference values measured by base stations after which it moves to a block 802. In the block 802, the load control checks whether the interference caused by an individual call to other calls is higher than permissible. The highest permissible interference may have been set, e.g. as a fixed percentage of the overall interference or as an absolute power. If there are no such calls, the load control moves back to the beginning to read the next measurement results.

If the load control observes a call, which causes other calls higher interference than permissible, it moves to a block 803 to check whether the interfering call is in a drift RNC. If the interfering call is not in a drift RNC, the load control moves to a block 804 wherein it demands the call control of its own RNC to reduce the power of the call or, alternatively, to disconnect the call.

If the interfering call is in a drift RNC, the load control moves to a block 805 wherein it demands the call control of a serving RNC, by sending a message over the Iur interface, to disconnect the interfering call or to reduce its power.

Naturally, the detailed embodiments of the invention presented above are only intended as exemplary, and they do not have a restricting effect on the invention.

What is claimed is:

1. A method of controlling the transmission power in a cellular radio system comprising terminals, base stations, and radio network controllers, and where transmission power control comprises an outer loop control, wherein a radio network controller provides a base station with transmission power controlling information, and a closed-loop control, wherein a base station and a terminal control the transmission power according to said controlling information, and which cellular radio system further comprises a load control, wherein a radio network controller monitors and balances the use of radio resources in the base stations that operate under it, characterized in that to control the transmission power in a macrodiversity connection where a given branch goes between the serving radio network controller and the terminal through the drift radio network controller and the drift base station, it comprises the steps of:
    transmitting information limiting the transmission power in said macrodiversity connection branch from the drift radio network controller to the serving radio network controller,
    transmitting the information controlling the transmission power of said macrodiversity connection branch from the serving radio network controller to the drift radio network controller, and
    transmitting information controlling the transmission power of said macrodiversity connection branch from the drift radio network controller to the drift base station.

2. A method according to claim 1, characterized in that for transmitting the information controlling the transmission power of said macrodiversity connection branch from the serving radio network controller to the drift radio network controller a special data transmission form, meant for data transmission between radio network controllers, is used whereupon the transformation into a data transmission form between a radio network controller and a base station takes place in the drift radio network controller.

3. A method according to claim 1, characterized in that said information limiting the transmission power in said macrodiversity connection branch comprises the downlink transmission power minimum and maximum, as well as the uplink Eb/NO ratio target value minimum and maximum.

4. A method according to claim 1, characterized in that said information controlling the transmission power in said macrodiversity connection branch comprises the downlink transmission power minimum and maximum and the uplink Eb/NO ratio target value.

5. A method according to claim 1, characterized in that the information limiting the transmission power in said macrodiversity connection branch is transmitted therein from the drift radio network controller to the serving radio network controller as response to an observation of a change in the load made by the drift radio network controller.

6. A radio network controller for controlling the operation of base stations in a cellular radio system comprising terminals, base stations, and radio network controllers, which radio network controller comprises
    means for establishing information, according to outer-loop control, controlling the transmission power and for transmitting it to a base station, and
    means for controlling the load by monitoring and balancing the use of radio resources in the base stations which operate under it, wherein
for operating as a serving radio network controller, to control the transmission power in a macrodiversity connection, a given branch of which goes between that radio network controller and a terminal through a drift radio network controller and a drift base station, it comprises:
    means for establishing information controlling the transmission power in said macrodiversity connection branch based on information limiting the transmission power received from said drift radio network controller, and
    means for transmitting the established information to said drift radio network controllers.

7. A cellular radio system comprising terminals, base stations, and radio network controllers and comprising, in at least two radio network controllers, means for establishing information, according to outer-loop control, controlling the transmission power and for transmitting it to a base station, and means for controlling the load by monitoring and balancing the use of radio resources in the base stations that operate under it, characterized in that to control the transmission power in a macrodiversity connection, a given branch of which goes between the first radio network controller and the terminal through the second radio network controller and the base station, it comprises,
    in the second radio network controller, means for establishing information limiting the transmission power and for transmitting it to the first radio network controller,
    in the first radio network controller, means for establishing information controlling the transmission power and for transmitting it to the second radio network controller, and
    in the second radio network controller, means for establishing information controlling the transmission power of the base station on the basis of the controlling information received from the first radio network controller and for transmitting it to the base station.

8. A radio network controller for controlling the operation of base stations in a cellular radio system comprising terminals, base stations, and radio network controllers, which radio network controller comprises:
    means for establishing information, according to outer-loop control, controlling the transmission power and for transmitting it to a base station, and
    means for controlling the load by monitoring and balancing the use of radio resources in the base stations which operate under it, wherein for operating as a drift radio network controller, to control the transmission power in a macrodiversity connection, a given branch of which goes between a serving radio network controller and a terminal through that radio network controller and a drift base station, it comprises:
- means for establishing information limiting the transmission power in said macrodiversity connection branch and for transmitting it to the serving radio network controller, and
- means for establishing information controlling the transmission power of the drift base station on the basis of controlling information received from the serving radio network controller and means for transmitting it to the drift base station.

* * * * *